US008289579B2

(12) United States Patent
Simske et al.

(10) Patent No.: US 8,289,579 B2
(45) Date of Patent: Oct. 16, 2012

(54) VARIABLE GUILLOCHE AND METHOD

(75) Inventors: Steven J. Simske, Fort Collins, CO (US); Henry Sang, Cupertino, CA (US); Philippe Mucher, Maastricht (NL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1512 days.

(21) Appl. No.: 11/699,237

(22) Filed: Jan. 29, 2007

(65) Prior Publication Data

US 2008/0180751 A1 Jul. 31, 2008

(51) Int. Cl.
*H04N 1/40* (2006.01)
*G06K 9/00* (2006.01)

(52) U.S. Cl. ...... 358/3.28; 358/3.29; 358/3.3; 358/3.31; 358/3.32; 358/1.9; 382/100; 382/135; 382/232; 382/248; 382/284; 382/250; 382/195; 380/201; 380/203; 380/250; 283/37; 283/39; 283/44; 283/73; 283/93; 283/113; 283/114; 283/902; 713/162; 713/176

(58) Field of Classification Search ................ 358/3.28, 358/3.29, 3.3, 3.31, 3.32, 1.9; 382/100, 135, 382/232, 284, 248, 250, 195
See application file for complete search history.

(56) References Cited

U.S. PATENT DOCUMENTS

| | | | | |
|---|---|---|---|---|
| 4,504,083 | A | 3/1985 | Devrient et al. | |
| 4,557,596 | A * | 12/1985 | Muller et al. | 355/132 |
| 5,057,931 | A * | 10/1991 | Numakura et al. | 358/1.9 |
| 6,345,104 | B1 | 2/2002 | Rhoads | |
| 6,602,578 | B1 | 8/2003 | Tompkin et al. | |
| 6,750,985 | B2 | 6/2004 | Rhoads | |
| 6,815,065 | B2 * | 11/2004 | Argoitia et al. | 428/403 |
| 6,840,721 | B2 * | 1/2005 | Kaule et al. | 409/132 |
| 6,859,534 | B1 | 2/2005 | Alasia | |
| 6,975,425 | B1 * | 12/2005 | Abe et al. | 358/1.18 |
| 7,002,710 | B1 * | 2/2006 | Van Liew et al. | 358/3.28 |
| 7,072,492 | B2 * | 7/2006 | Ogawa et al. | 382/100 |
| 7,078,090 | B2 | 7/2006 | Tompkin et al. | |
| 7,081,819 | B2 | 7/2006 | Martinez de Velasco Cortina et al. | |
| 7,403,309 | B2 * | 7/2008 | Moncrieff | 358/3.12 |
| 8,055,064 | B2 * | 11/2011 | Kiuchi et al. | 382/162 |
| 2004/0066441 | A1 | 4/2004 | Jones et al. | |
| 2005/0035590 | A1 | 2/2005 | Jones et al. | |
| 2005/0042396 | A1 | 2/2005 | Jones et al. | |
| 2005/0069134 | A1 * | 3/2005 | Taunton et al. | 380/255 |

OTHER PUBLICATIONS

"Hidden and Scrambled Images—A Review", Ruodlf L. van Renesse, Conference on Optical Security and Counterfiet Deterrence Techniques IV, San Jose, California, Jan. 27-28, 2002, SPIE vol. 4677, pp. 333-348.*

Rudolf L. Van Renesse, Conference on Optical Security and Counterfeit Deterrence Technique IV, Jan. 27, 2002, SPIE vol. 4677, pp. 333-348.*

* cited by examiner

*Primary Examiner* — Steven Kau

(57) ABSTRACT

A variable guilloche includes at least two guilloche curves, printed in a common space and having at least one point of overlap. The at least two curves are plotted from equations having variables corresponding to a specified data string of steganographic information.

20 Claims, 16 Drawing Sheets

VARIABLE GUILLOCHE AND METHOD

BACKGROUND

Brand protection and product security can include the use of eye-catching, difficult-to-reproduce overt elements, or deterrents. The term "overt" refers to a visible or observable feature. One type of commonly used overt security element is a guilloche. Guilloche patterns are spirograph-like curves that frame a curve within an inner and outer envelope curve. These patterns are often formed of two or more curved bands that interlace to repeat a circular design, and are most commonly used on banknotes, securities, passports, and other documents as a protection against counterfeit and forgery.

Guilloche patterns can be plotted in polar and Cartesian coordinates, and these can be generated by a series of nested additions and multiplications of sinusoids of various periods. Guilloche patterns have traditionally provided an overt deterrent to copying and counterfeiting because of the difficulty of reproducing the complex patterns. In this context it is worth recognizing that overt deterrents generally rely for their effectiveness on visual detection. For an overt security element to inhibit and allow detection of forgery, a person or machine is used to notice the difference in a guilloche pattern or other complex pattern of lines (e.g. the individual lines in the portrait of George Washington on U.S. currency) in the document. In the past, forgers and counterfeiters have had to try to exactly recreate an original document or engraving by hand or other methods. Accurately reproducing a complex guilloche pattern using these methods is very difficult, and alternatives such as copying are frequently unsatisfactory due to the fine lines in the patterns.

More recently, however, the production and reproduction of guilloche patterns has been greatly simplified by the use of computer and graphics technology. Using computerized printing systems, highly complex guilloche patterns can be produced at very high resolution. Additionally, using high resolution color scanning and printing systems that are commercially available, counterfeiters and forgers can reproduce security documents in a manner that can fool all but the most trained observers. Since overt security features generally rely upon observation for detection of counterfeits, a high quality copy can be so close to the original that only an expert paying very close attention can detect the forgery.

BRIEF DESCRIPTION OF THE DRAWINGS

Various features and advantages of the invention will be apparent from the detailed description which follows, taken in conjunction with the accompanying drawings, which together illustrate, by way of example, features of the invention, and wherein.

DETAILED DESCRIPTION

Figure 1:
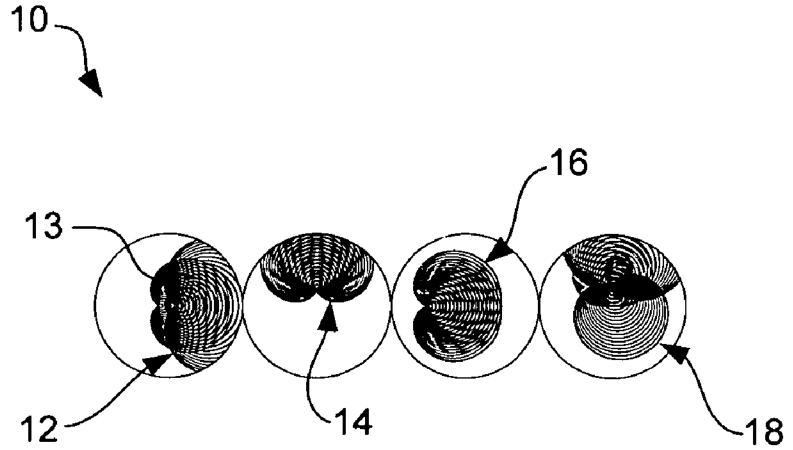
FIG. 1 provides four examples of cardioid guilloche patterns that can be prepared in accordance with the present disclosure, these examples being shown actual size.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one skilled in the relevant art and having possession of this disclosure, are to be considered within the scope of the invention.

As noted above, high quality computer scanning and printing equipment have made the unauthorized reproduction of documents having overt security elements simpler and harder to detect. Since overt security elements generally rely upon detection by a trained person, overt deterrents are more powerful if they are associated with anti-tampering and/or covert (hidden) or forensic information. Covert or hidden security features are usually invisible to the unaided eye, or else are not obvious to a non-expert, or require specialized equipment to view. Covert security features in documents include digital watermarks, ultraviolet and/or infrared inks, underprinted inks and/or substrates, or steganographic information incorporated into visible printed areas.

The inventors have recognized the desirability of combining overt and covert security features that can be used in document production. In particular, the inventors have developed methods for producing a variable guilloche that includes covert security features that include steganographic information. The term "steganographic information" as used herein refers to covert information that is embedded in a visible feature of a document. One example of a visible feature embodying steganographic information is the ubiquitous bar code pattern that is imprinted on product packages, labels and the like to provide product identification and price information in supermarkets, etc. The pattern of wide and narrow lines in the bar code is visible to the user, and is also detectable by an optical scanner, and conveys a number of bits of digital information about the product, allowing highly automated price scanning and inventory control.

The inventors have devised a variable guilloche system in which guilloche patterns embody a number of bits of digital information. The variable guilloche system and method disclosed herein provides an overt deterrent that is based upon multiple families of curves. The inventors' approach provides a relatively high bit density of information using guilloche patterns that are skew-insensitive. Additionally, through the use of variable control of the guilloche elements—the spacing between lines, the line thicknesses, curve families, line color, angles, curve set size, and x and y offset of the curve sets—a large number of unique identifiers can be embedded as steganographic information in the visible guilloche. Additionally, the variable control of line thickness, spacing, etc., can enhance printing quality, depending upon the print technology, and also allows for the addition of new patterns and features to increase pattern combinations.

In one embodiment disclosed herein, a variable guilloche can contain 64 bits of information. The 64 bit configuration illustrates a combination of variable and brand-specific elements that can be placed in the deterrent. Other configurations are also possible. In addition to the digital payload of information, the guilloche can be identified based on the "initial conditions" of the feature (including the starting angle, colors, and size). The information embedded in the guilloche can also include a single checkbit, or additional checkbits, if desired.

Value can also be added to the feature through the use of quantum dots (i.e. luminescent particles dispersed in the ink) or other luminescent inks. Manual and machine-based authentication methods also show how the restrictions placed on the guilloche during its generation aid in its authentication. Alternative authentication approaches for luminescent inks can also be used.

In one embodiment, for the purposes of providing a platform for overt, covert and forensic features, the inventors have developed a guilloche providing a 400-pixel diameter circular feature that includes cyan (C), magenta (M) and yellow (Y) sets of curves. While multi-color guilloche examples are presented and described herein, the variable guilloche principles disclosed herein can also be applied to monochromatic guilloche patterns (as in FIG. 23, discussed below). Variable guilloche patterns in accordance with the present disclosure can be multi-color or monochromatic. Additionally, suitable colors are not limited to cyan, magenta and yellow, but can include any printing color or combination of colors, such as red, green and blue (as in FIG. 22, where the guilloche patterns are in the colors of magenta, yellow and green, discussed below).

A group 10 of four exemplary three-color guilloche patterns 12, 14, 16 and 18 that can be prepared in accordance with these parameters are shown in FIG. 1. These guilloche examples are printed just slightly larger than an actual size that the inventors have used. With a diameter of 400 pixels printed at a resolution of around 800 dpi, the guilloche patterns are just under ½ inch in diameter. It should be noted, however, that guilloche patterns produced in accordance with the present disclosure can be any size. The examples provided in the remainder of the figures are shown at a larger scale for greater clarity.

For general guilloche curves, parametric equations are used. For two-dimensional printed patterns, these equations take the form of $x=f(t)$ and $y=g(t)$. The inventors have selected eight special curve sets using polar coordinates, in which the equations are:

$$r=f(\theta) \quad \text{(eq. 1)}$$

$$x=r*\cos(\theta) \quad \text{(eq. 2)}$$

$$y=r*\sin(\theta) \quad \text{(eq. 3)}$$

These equations can produce eight families of curves: (1) cardioids; (2) roses; (3) limaçons; (4) lemniscates; (5) spirals; (6) conchoids; (7) elliptic conic sections; and (8) hyperbolic conic sections. The following discussion will consider the equations and variables involved and discuss exemplary guilloche patterns that are produced thereby.

Cardioids are produced according to the following equation:

$$r=A*(1+\cos(\theta-\text{ANG})) \quad \text{(eq. 4)}$$

In this equation, r is the radial coordinate position for a given point in the curve. A is a constant (a real number greater than zero) representing the relative size of the pattern in pixels, and ANG is a constant representing the starting angle of the pattern (in radians). In the guilloche examples provided herein, a zero value for the variable ANG is equivalent to the 3 o'clock position. It will be apparent, however, that any other starting angle (e.g. zero=12 o-clock position) can also be used, depending on preference. In one embodiment, the size variable A for a family of curves according to equation 4 can be selected from the series {1.0, 1.067, 1.133, . . . , 2.0}. The angular value $\theta$ is varied from 0 to $2\pi$ with a step size that can be selected by the user. One method of selecting the step size is described below.

The four exemplary guilloche patterns 10 provided in FIG. 1 are examples of cardioid guilloche patterns that have been produced from equation 4. For example, the first guilloche 12 of FIG. 1 (far left) includes: (1) a cyan cardioid, wherein A=0.5, ANG=0, and which is offset by 25 pixels in the −y direction; (2) a magenta cardioid 13, wherein A=1.0, ANG=0, and which is offset by 25 pixels in the −x direction; and (3) a yellow cardioid, having A=1.5, ANG=0, and offset by 25 pixels in the x direction. The second guilloche 14 of FIG. 1 (left center) includes: (1) a cyan cardioid having A=1.0, ANG=4.71, and an offset of 50 pixels in the −y direction; (2) a magenta cardioid having A=1.0, ANG=5.02, and offset by 50 pixels in the −y direction; and (3) a yellow cardioid having A=1.0, ANG=4.40, and offset by 50 pixels in the −y direction. The third guilloche 16 of FIG. 1 (right center) includes: (1) a cyan cardioid having A=1.0, ANG=0, and offset by 100 pixels in the −x direction; (2) a magenta cardioid having A=1.0, ANG=−0.31 and offset by 100 pixels in the −x direction; and (3) a yellow cardioid having A=1.0, ANG=0.31, and offset by 100 pixels in the −x direction. The remaining guilloche patterns shown herein are produced with various combinations of variables in the same general way as those in FIG. 1, but for brevity the exact variable values will not be given for the remaining figures.

Figure 2:
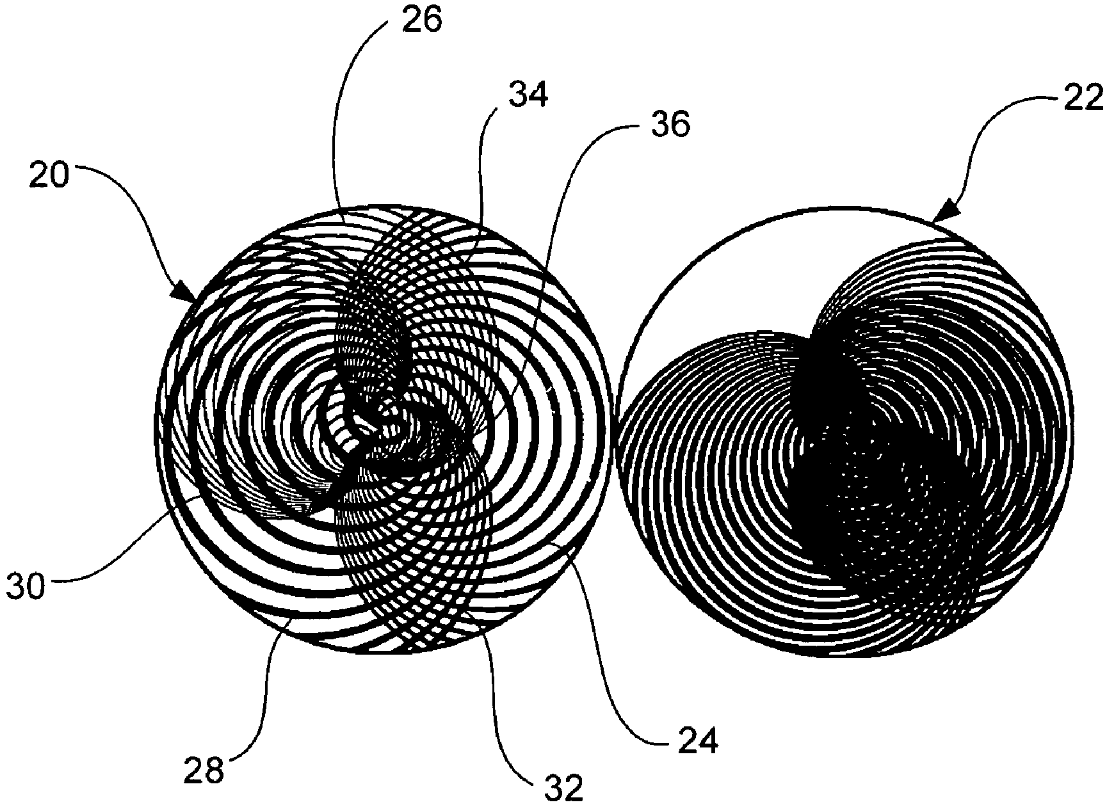
FIG. 2 provides two examples of cardioid guilloche patterns after qualification.

The guilloche patterns shown in FIG. 1 are patterns that have not been qualified. Provided in FIG. 2 are two examples of cardioid guilloche patterns 20, 22 after qualification. As used herein, the terms "qualified" and "qualification" refer to the process of selecting guilloche patterns for use. Guilloche patterns denoted herein as being "before qualification" represent guilloche patterns produced by generic or perhaps randomly selected combinations of variable values. For example, rather than selecting values from a given numerical series presented above, values that are intermediate of numbers in such a series can be tried. Guilloche patterns denoted as being "after qualification" represent patterns that have been produced by selected sequences of variable values, and are also considered good choices to use as security features. For example, the theoretical range of values for certain variables may be very large, but as a practical matter, all variable combinations may not be suitable. In selecting variables, sensitivity analysis can be used to select useful values. Additionally, it is desirable that different selected combinations of variables do not produce curves that merely repeat each other. Thus a set of variables is first tried and the results considered before the resulting guilloche pattern is considered qualified.

In the cardioid guilloche patterns 20 and 22 in FIG. 2 the three curves of base printing colors cyan (C), magenta (M) and yellow (Y) can be seen. For example, it can be seen that guilloche 20 includes a cyan cardioid curve set 24, a magenta cardioid curve set 26, and a yellow cardioid curve set 28. At points where any two of these base color curves cross, the component colors red (R) green (G) and blue (B) are produced, depending upon the particular base colors. For example, viewing guilloche 20, a red point 30 is produced where yellow and magenta lines cross, a green point 32 is produced where cyan and yellow lines cross, and a blue point 34 is produced where cyan and magenta meet. Additionally, at any points where all three base colors cross, such as at point 36, black is produced. This combining of colors adds a dimension of security by producing a unique pattern of various color dots within the overall pattern or colored curves. This provides an additional avenue for authentication, as discussed below, and makes copying more difficult.

Figure 3:
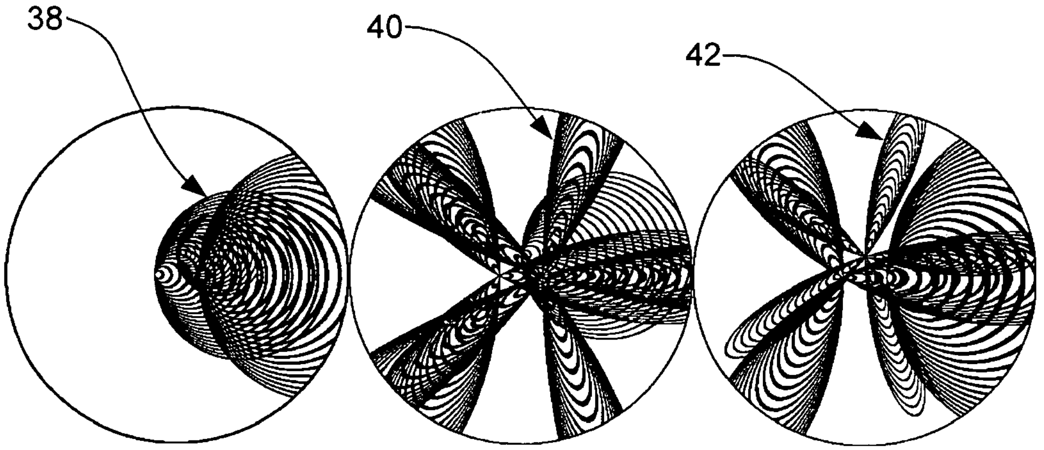
FIG. 3 provides three examples of rose shaped guilloche patterns before qualification.
Figure 4:
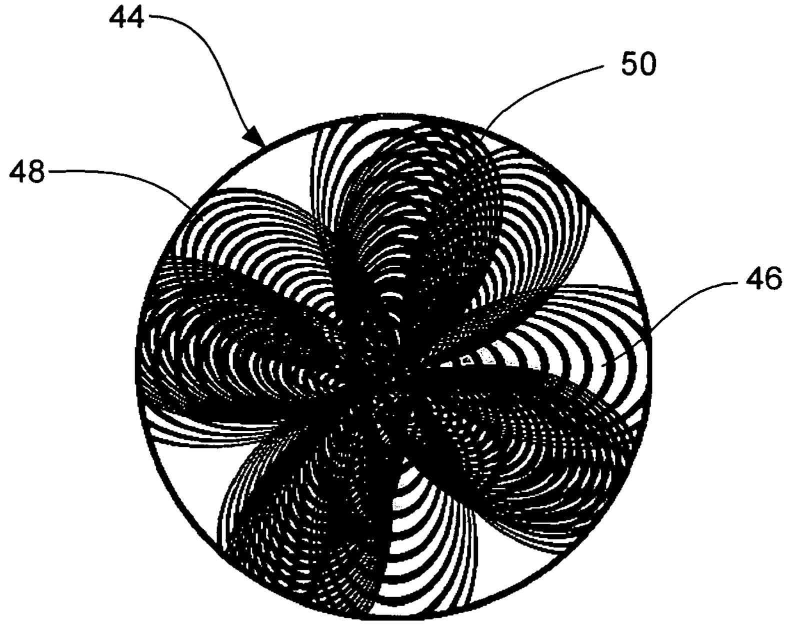
FIG. 4 provides one example of a rose shaped guilloche pattern after qualification.

Rose shaped guilloche patterns are produced according to the following equation:

$$r=A*\cos(N(\theta-ANG)) \qquad \text{(eq. 5)}$$

where r, θ, A and ANG are as defined above. The variable N is an integer that determines whether the rose has four leaves (N=2) or three leaves (N=3). In one embodiment the size variable A can vary according to the series {1.0, 1.0714, 1.1429, . . . , 1.5}. Provided in FIG. 3 are three examples 38, 40, 42 of rose shaped guilloche patterns before qualification. FIG. 4 provides one example 44 of a rose shaped guilloche pattern after qualification. Again, the patterns of cyan curves 46, yellow curves 48 and magenta curves 50 produce R, G and B points where any two of them intersect, and black points where all three overlap. Advantageously, the rose shaped guilloche patterns are visibly and machine-reader distinguishable from the cardioid and other guilloche shapes described herein.

Figure 5:
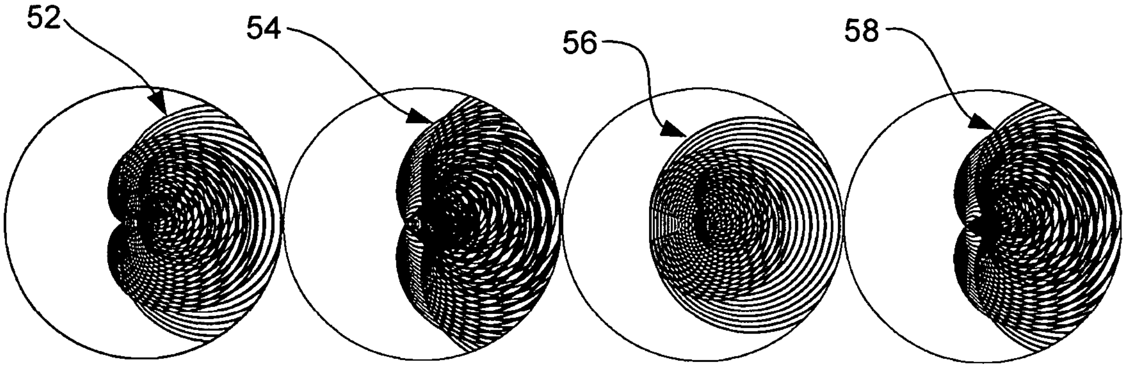
FIG. 5 provides four examples of limaçon guilloche patterns before qualification.
Figure 6:
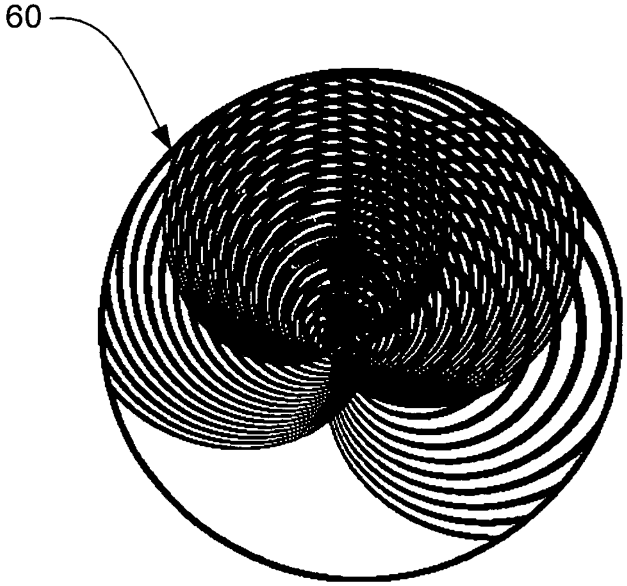
FIG. 6 provides one example of a limaçon guilloche pattern after qualification.

Guilloche patterns having a limaçon shape are produced according to the following equation:

$$r=A+B*\cos(\theta-ANG) \qquad \text{(eq. 6)}$$

where r, θ, A and ANG are as defined above, and B is a real number. In one embodiment the size variable A can vary according to the series {1.0, 1.0714, 1.1429, . . . , 1.5}. The variable B can be dependent upon the value of A. For example, as discussed below, one bit of the size variable A can be used to determine whether B=1.5 or B=0.5. Provided in FIG. 5 are four examples of limaçon guilloche patterns 52, 54, 56, 58 before qualification. FIG. 6 provides one example of a limaçon guilloche pattern 60 after qualification. Again, the limaçon shaped guilloche patterns are visibly and machine-reader distinguishable from the cardioid, rose and other guilloche curves described herein.

Figure 7:
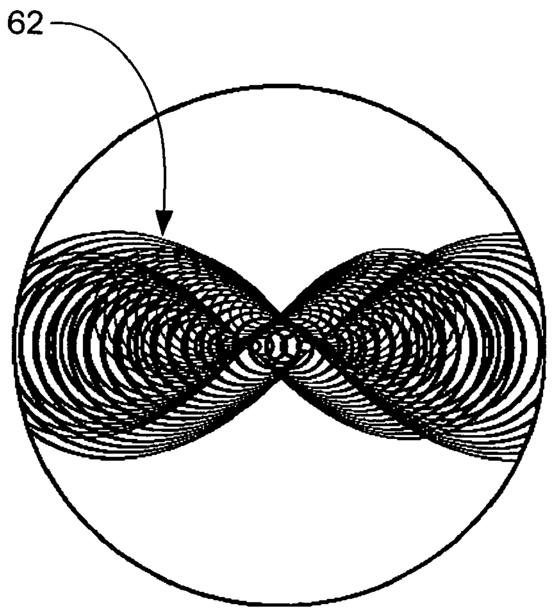
FIG. 7 provides one example of a lemniscate guilloche pattern before qualification.
Figure 8:
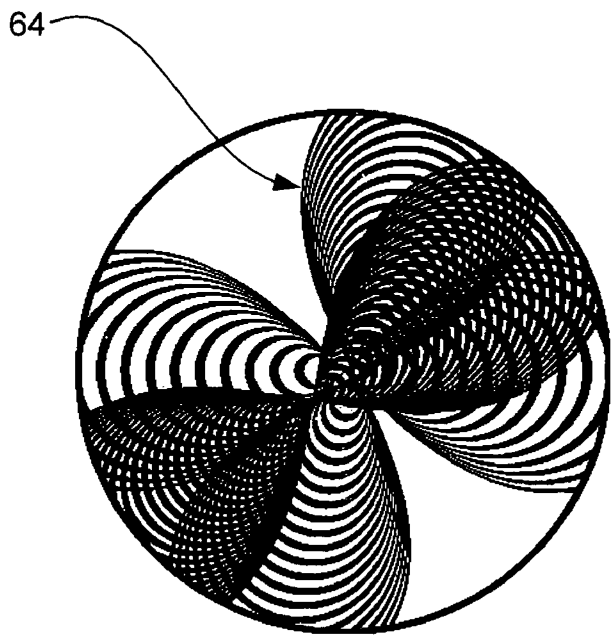
FIG. 8 provides one example of a lemniscate guilloche pattern after qualification.

Lemniscate guilloche patterns are produced according to the following equation:

$$r=\text{Sqrt}(A*\cos(2*\theta-ANG)) \qquad \text{(eq. 7)}$$

where r, θ, A and ANG are as defined above. In one embodiment the size variable A can vary according to the series {1.0, 1.067, 1.133, . . . , 2.0}. Provided in FIG. 7 is one example of a lemniscate guilloche pattern 62 before qualification. FIG. 8 provides one example of a lemniscate guilloche pattern 64 after qualification. Again, these guilloche patterns are visibly and machine-reader distinguishable from the other guilloche shapes described herein.

Figure 9:
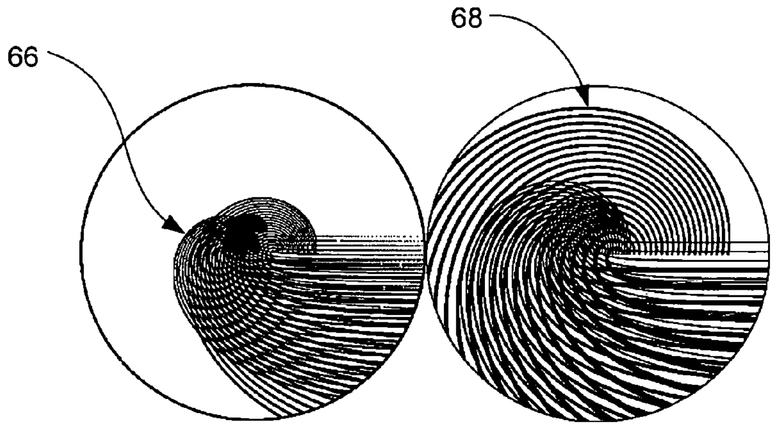
FIGS. 9-12 provide nine examples of spiral guilloche patterns before qualification.

Spiral guilloche patterns can be produced according to four different equations. In each of these equations the values of A and ANG are as described above. The first option is:

$$r=A/(\theta-ANG) \qquad \text{(eq. 8)}$$

where r and θ are as defined above. Two examples of guilloche patterns 66, 68 produced according to this equation are shown in FIG. 9.

Figure 10:
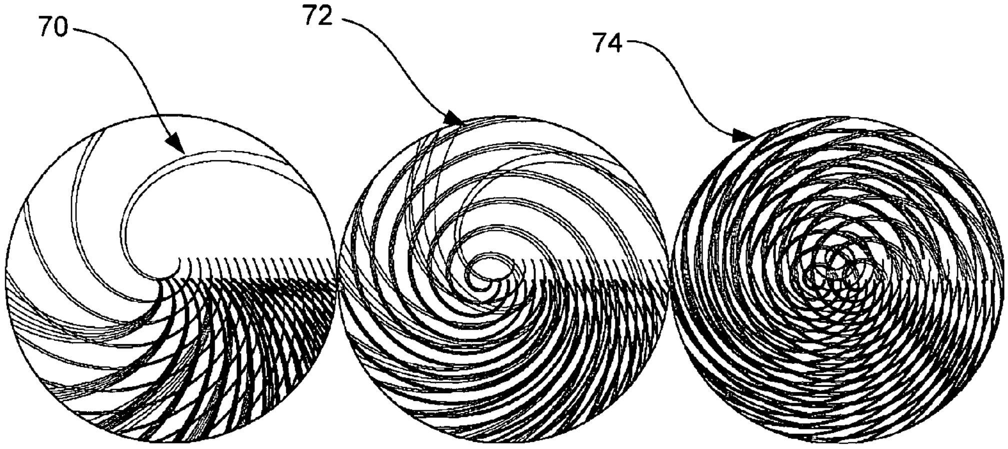

The second spiral guilloche option is the equation:

$$r=eA*(\theta-ANG) \qquad \text{(eq. 9)}$$

where r, θ, A and ANG are as defined above, and e is the fundamental constant of the exponential function (e=2.71828 . . . ). Three examples of guilloche patterns 70, 72 and 74 produced according to this equation are shown in FIG. 10.

Figure 11:
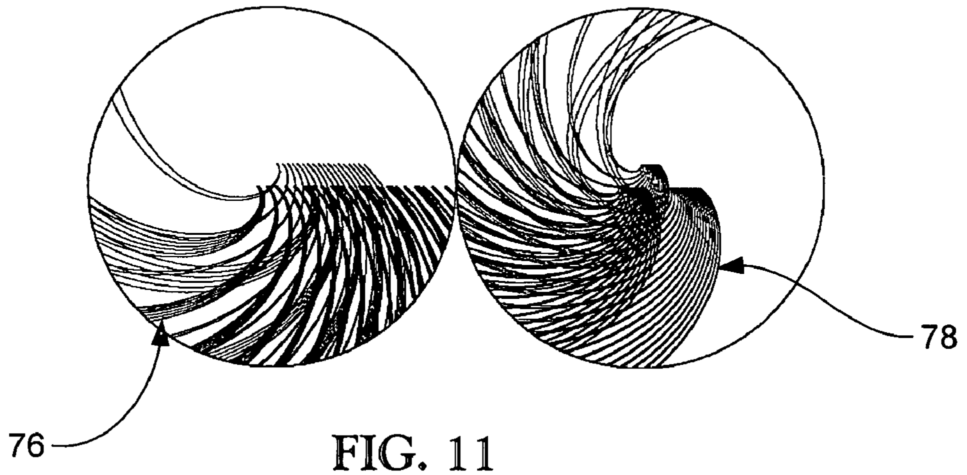

The third spiral guilloche equation is:

$$r=A*e(\theta-ANG) \qquad \text{(eq. 10)}$$

where r, θ, A, e and ANG are as defined above. Two examples of guilloche patterns 76, 78 produced according to this equation are shown in FIG. 11.

Figure 12:
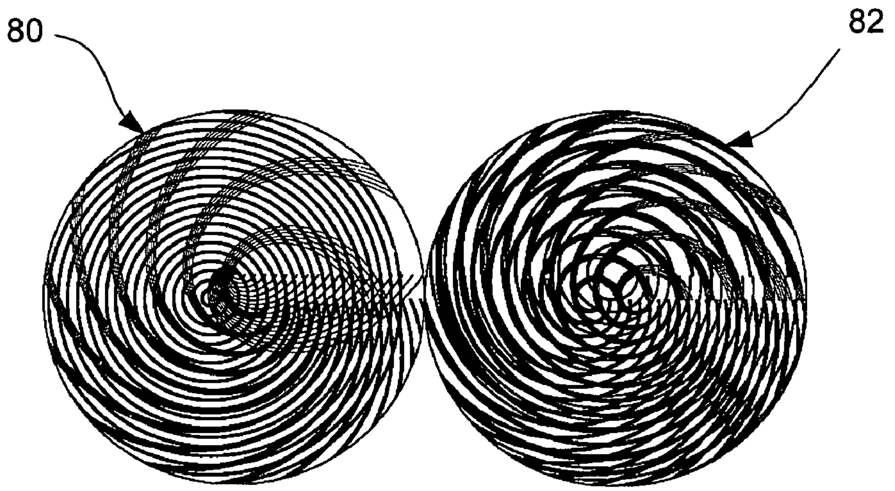

The fourth spiral guilloche equation is:

$$r=A(\theta-ANG) \qquad \text{(eq. 11)}$$

where r, θ, A and ANG are as defined above. Two examples of spiral guilloche patterns 80, 82 produced according to this equation are shown in FIG. 12.

Figure 13:
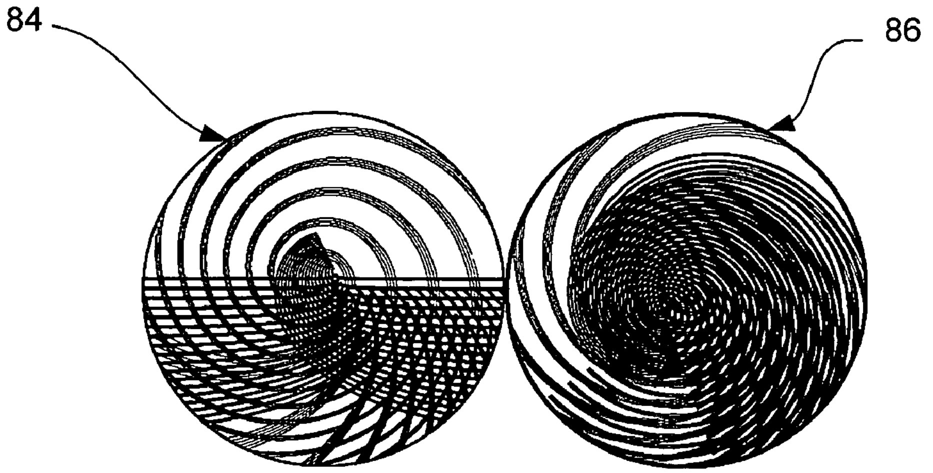
FIG. 13 provides two examples of spiral guilloche patterns after qualification.

Provided in FIG. 13 are two examples of spiral guilloche patterns 84, 86 after qualification. The guilloche pattern 84 on the left side of FIG. 13 is a combination of two spirals from equation 9 and one from equation 8. The guilloche pattern 86 on the right side of FIG. 13 is a combination of two spirals from equation 8 and one from equation 9. As with the other guilloche patterns discussed above, the spiral guilloche patterns are visibly and machine-reader distinguishable from the other guilloche shapes described herein.

Figure 14:
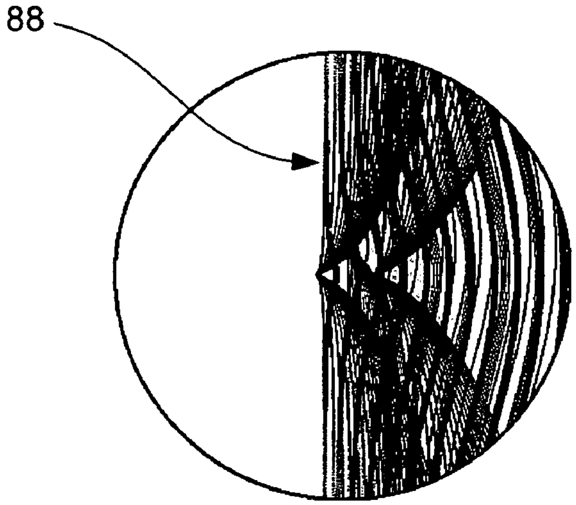
FIG. 14 provides one example of a conchoids guilloche pattern before qualification.
Figure 15:
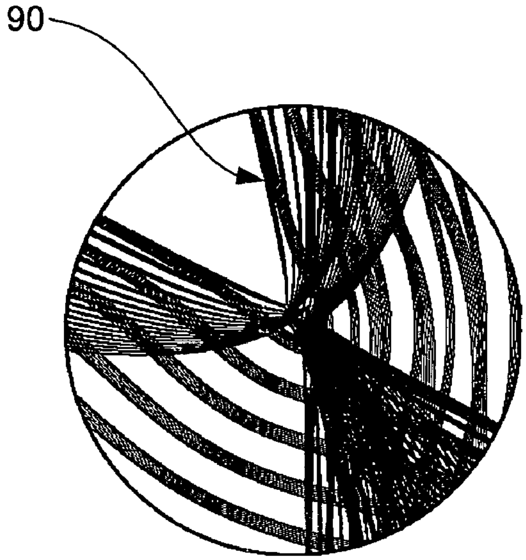
FIG. 15 provides one example of a conchoids guilloche pattern after qualification.

Variable guilloche patterns in accordance with the present disclosure can also have a conchoid shape, and examples of conchoids guilloche patterns 88, 90 are shown in FIGS. 14 and 15. Conchoid guilloche patterns can be produced according to the following equation:

$$r=A*(1+\sec(\theta-ANG)) \qquad \text{(eq. 12)}$$

where r, θ, A and ANG are as defined above. In one embodiment the size variable A can represent the series {1.0, 1.067, 1.133, . . . , 2.0}. One example of a conchoid guilloche pattern 88 is shown in FIG. 14. FIG. 15 provides one example of a conchoid guilloche pattern 90 after qualification. Once again, the conchoid guilloche patterns are visibly and machine-reader distinguishable from the other guilloche shapes described herein.

Figure 16:
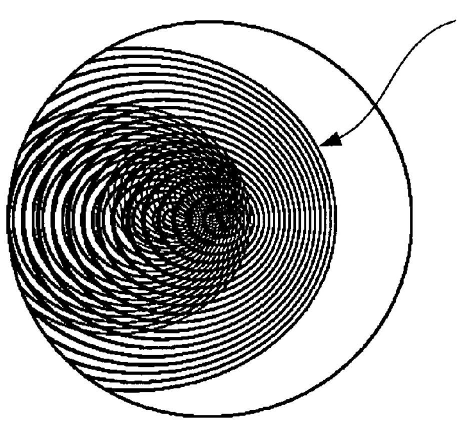
FIG. 16 provides one example of an elliptical conic section guilloche pattern before qualification.
Figure 17:
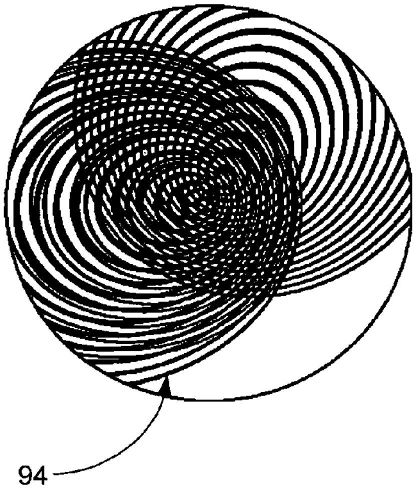
FIG. 17 provides one example of an elliptical conic section guilloche pattern after qualification.

Variable guilloche patterns can also be produced having an elliptic conic section shape. These are produced according to the following equation:

$$r=A*B/(1+B*\cos(\theta-ANG)) \quad \text{(eq. 13)}$$

where r, θ, A and ANG are as defined above, and B is a real number between zero and one. In one embodiment, the inventors have set B=0.5, and have set the size variable A to represent the series {1.05, 1.10, 1.15, . . . , 1.80}. Provided in FIG. 16 is one example of an elliptical conic section guilloche pattern 92 before qualification. FIG. 17 provides one example of an elliptical conic section guilloche pattern 94 after qualification. These guilloche patterns are also visibly and machine-reader distinguishable from the other guilloche shapes described herein.

Figure 18:
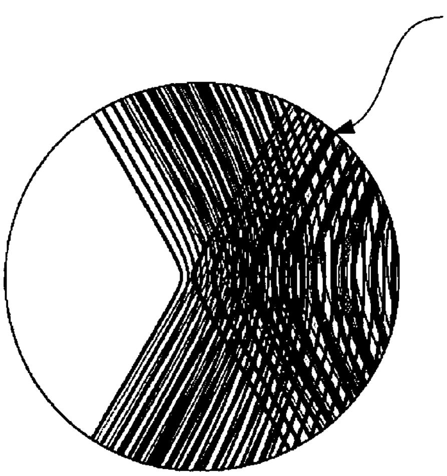
FIG. 18 provides one example of a hyperbolic conic section guilloche pattern before qualification.
Figure 19:
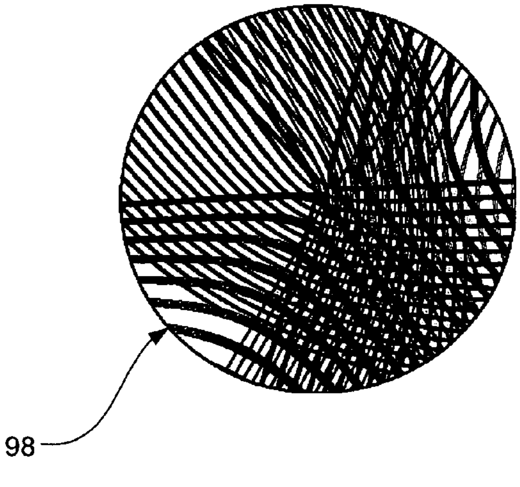
FIG. 19 provides one example of a hyperbolic conic section guilloche pattern after qualification.

Guilloche patterns that are visibly and machine-reader distinguishable from the other guilloche shapes described herein can also be selected from among hyperbolic conic sections. These are produced according to the equation:

$$r=A*B/(1+B*\cos(\theta-ANG)) \quad \text{(eq. 14)}$$

where r, A and ANG are as defined above, and B is a real number that is greater than one. In one embodiment, the variable B was set equal to 2.0, and the size variable A was selected to represent the series {0.5, 0.567, 0.633, . . . , 1.5}. Provided in FIG. 18 is one example of a hyperbolic conic section guilloche pattern 96 before qualification. FIG. 19 provides one example of a hyperbolic conic section guilloche pattern 98 after qualification.

Advantageously, each of the guilloche patterns described above (and a very large number of additional different patterns) can be mapped from a unique 64 bit (or 8 byte) sequence. In other words, each of the features of the above-described guilloche patterns (in spite of different numbers of variables, different overt appearance, and different asymptotic behavior) can represent different values for a digital sequence, allowing the guilloche to represent the digital data. The following discussion will explain how this is done.

The guilloche curves have static elements that can be used for brand identification. The first is the set of colors used. As noted above, the variable guilloche principles disclosed herein can apply to monochromatic or multi-color guilloche patterns. It will be noted that the use of monochromatic guilloche patterns can result in a lower bit density of encodable information because two like curves of different colors will not be available for use.

Considering multi-color guilloche patterns, for simplicity the colors cyan (C), magenta (M) and yellow (Y) can be selected for the first, second and third sets of the guilloche curves. These are common base printing colors, and, as noted above, when combined create other component colors. For example, magenta and yellow combined will produce red, cyan and magenta will produce blue, and cyan and yellow will produce green. Where all three base ink colors are combined, the result will be black. Consequently, using three base ink colors for the individual curves, a total of seven colors can be produced in the guilloche pattern. The digital sequence can comprise 65 bits of data (numbered 0-64), which includes 64 variable bits, and 1 checksum bit. While the exemplary sequence actually includes 65 bits of data, it is referred to herein as a 64 bit sequence because the bits are numbered 0 to 64. These bits can be assigned for each of the colors.

A curve set produced in a given color is referred to herein as a "feature". For example, for the first feature (of color cyan), with an initial angle (ANG) of 0.0 and no offset in x or y, bits 0-2 of the 64 bit sequence can determine which family of curves (of 8) will be used; bits 9-12 can set the size (which varies by feature, as discussed below); bits 21-22 can set the line thickness (1, 2, 3 or 4 pixels); and bits 27-28 can govern the line spacing (4, 6, 8 or 10 pixels). For rose shaped guilloche patterns, one bit of the size variable (A in eq. 5) can be used to determine whether the rose is a 4-leaf (N=2) or 3-leaf (N=3) rose by making this bit even or odd. For limaçon shaped guilloche patterns, one bit of the size variable (A in eq. 6) can be used to determine whether B=1.5 or B=0.5.

As noted above, for spiral guilloche patterns there are four possible equations that can be used. For these patterns, 2 bits of the size variable (A in eqs. 8-11) can be used to indicate whether the pattern is spiral according to eq. 8, 9, 10 or 11. The remaining 2 bits of the size variable can determine the size according to the following. For spirals according to eq. 8, the last two bits of the size variable can represent the series {1, 2, 3, 4}. For spirals according to eq. 9, the last two bits of the size variable can represent the series {0.10, 0.15, 0.20, 0.25}. For spirals according to eq. 10, the last two bits of the size variable can represent the series {0.12, 0.18, 0.24, 0.30}. For spirals according to eq. 11, the last two bits of the size variable can represent the series {1.1, 1.2, 1.3, 1.4}.

For the second feature (magenta), with an x and y offset and the angle (ANG) varied from 0.0, bits 3-5 can determine which family of curves (of 8); bits 13-16 set the size A (same as above); bits 23-24 set the line thickness (same as above); bits 29-30 set the line spacing (same as above); and bits 33-36 determine the offset in x. To simplify authentication, the second feature can be given a negative "x offset" so that its origin is on the left hand side of the feature, for example. An example of this is shown in guilloche curve 12 of FIG. 1, wherein the magenta curve set 13 has a negative x offset. In one embodiment, this offset in x can vary according to the series −2, −4, . . . −32 pixels.

Continuing with the second feature, bits 41-45 determine the offset in y, which can be nonzero, and vary according to the series {−32, −30, −28, . . . , −2, 2, 4, . . . , 32}. An example of this is also shown in the second guilloche pattern 14 of FIG. 1, wherein all three cardioids have a y offset of −16.

Finally, bits 51-57 can determine the initial angle (ANG). This angle can be varied based on the x and y offsets and the 7 bits that set the angle (thus having a possible value range from 0 to 127). The value of ANG can thus be represented by:

$$ANG=\tan^{-1}(y\ \text{offset}/x\ \text{offset})+(\pi/2)+(\pi*SUM/127) \quad \text{(eq. 15)}$$

The variable SUM is the sum of the powers of two indicated by the 7 bits for the ANG variable. That is, SUM equals 2 raised to the power of the sum of the seven bits that determine ANG. Thus if bits 51-57 have the values 1 1 0 1 0 0 1, their sum will be 4, and the value of SUM will be $2^4=16$. This approach causes more of the curve sets to occur within the border of the feature because it forces each curve to "open" toward the side opposite the offset, thus reducing the amount of the curve that is cropped by the border of the guilloche. That is, if the guilloche curve set is actually larger than the bordered region, a larger percentage of it will be visible this way.

For the third feature (of color yellow), with an x and y offset and the angle (ANG) varied from 0.0, bits 6-8 can determine the family of curves (of 8); bits 17-20 can determine the size (same as above); bits 25-26 set the line thickness (same as above); bits 31-32 set the line spacing (same as above); and bits 37-40 can set the offset in x. For this feature, the "x offset" can be positive, so that the feature has its origin on the right-hand side of the guilloche pattern. For example, the yellow cardioid in the first guilloche 12 of FIG. 1 has a positive x offset so that the origin of this curve set is on the right hand side. The offset in x can vary according to the series {2, 4, . . . , 32}, for example. Bits 46-50 can set the offset in y (same as above), while bits 58-63 set the angle ANG in the same manner discussed above).

Given the equation for ANG presented above, 7 bits are used to specify the angle. The first 6 of these 7 bits are specified by bits 58-63. The last bit is the checkbit. This bit can have a role in the angle of the third feature. The checkbit can be determined based upon the sum of all prior bits. If the sum of bits 0-63 is odd, then the checkbit is 1 (odd). If the sum of bits 0-63 is even, then the checkbit is 0 (even). It will be noted that this checkbit feature offers limited security for an individual guilloche pattern, since it can be guessed correctly 50% of the time. However, it can provide better protection for a large number N of guilloche patterns, since the chance of guessing all checkbits correctly will be 1 in $2^N$, which becomes a very small probability as N increases.

While features described above are varied to provide the information embedded in the guilloche pattern, there are other features or elements that are not varied in the present examples, but could be. Some elements that are not varied are given in the following list, along with the potential number of bits of information they could add if they were varied:

Color: 5-7 bits, depending on authentication algorithms
Starting angle of the first feature: 8-9 bits
Size of feature: 5-10 bits, depending on shape
Shape of feature: 2-10 bits, depending on complexity
Border thickness and color: 3-5 bits Thus another 23-41 bits, or 3-5 bytes, of data can be added to the set of guilloche features, but can also be reserved for brand assignment. In other words, these settings can be used to identify (and later authenticate) the owner of specific guilloche patterns. For example, for a product called "ABC Cola" the starting angle of the first feature can be set at 15 degrees and use a boundary having the shape of the letter "A" instead of a circle or square, while for "XYZ Cola" the starting angle of the first feature can be set at 45 degrees and have an "X" shaped boundary instead of a circle or square.

Other sources of variability not exploited in the above-described guilloche embodiments and not included in the above list are additional values for polar equation variables, use of other curves sets (including lines), and non-uniform backgrounds. Moreover, some of the bits used for variability can be used instead for error-checking. For example, while the inventors have used the last specified bit as a checksum bit, a different kind of checksum approach can be used. For example, bits 57-64 can be the 1's complement sum of the first 7 bytes (56 bits) of the feature, thus using 9 bits for checksum and the first 56 bits for payload information.

Many of the choices made in selecting values for the variables in the curve families of the guilloche are made to avoid any two specified curve sets from being identical. While some sets will certainly be similar, none will be identical. In the process of qualification, the features are evaluated empirically to determine the values presented above.

Figure 20:
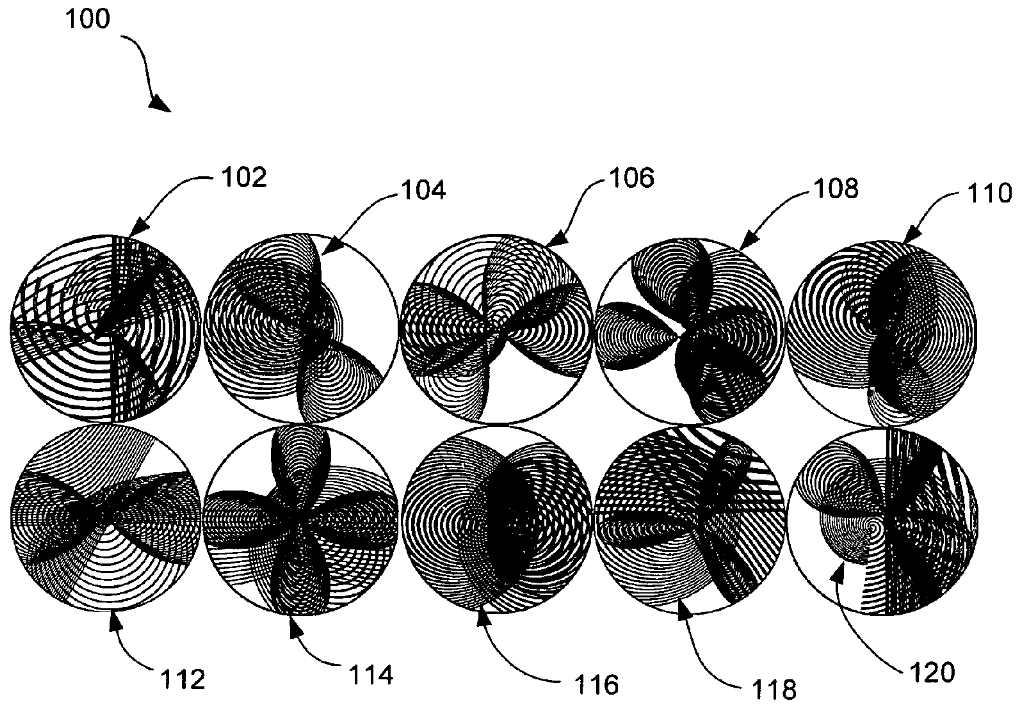
FIG. 20 provides ten examples of guilloche patterns corresponding to ten specific 64-bit sequences.

Provided in FIG. 20 is a group 100 of ten guilloche units that can be represented by a unique 64 bit binary sequence in the manner discussed above. The guilloche patterns indicated by reference numerals 102 to 120 represent the following 64 bit binary sequences, respectively:

Guilloche 102: 1011011001011001110101000111010111010010011101001000010110101101

Guilloche 104: 1101100110101000010101001011101010001011101010100100010100000101

Guilloche 106: 0110110001110110111011100000110101011100010101010100000011111110

Guilloche 108: 0100110111101000101011010110100001010101010101011111010101010000

Guilloche 110: 0101100111101110000000111000001110101010101010101111000000000011

Guilloche 112: 0110101111101110000101000101110101000011010101011111010000011110

Guilloche 114: 0011001101010110010111001010011100101011100001101111000101011110

Guilloche 116: 0101101101010110111001010110100101011101110110110111010110010101

Guilloche 118: 1101110011011101100010111010110001110100101110101010001111010011

Guilloche 120: 1011000111011101000111010100001011010001010101010000001111010010

While the exemplary guilloche patterns shown in FIGS. 1-19 use the same type of curve family (i.e. all cardioid curves) for each feature (i.e. each color), it will be apparent that a single guilloche pattern constructed according to a 64 bit sequence in the manner discussed above can use a different curve family for each of the features. The guilloche patterns provided in FIG. 20 each combine multiple curve families. Guilloche 102 includes one spiral and two conchoids curves. Guilloche 104 includes two elliptical conic sections, and one lemniscate curve family. Guilloche 106 includes two lemniscates and a cardioid. Guilloche 108 includes a cardioid and two lemniscate curves. Guilloche 110 includes a cardioid, a lemniscate and an elliptic conic section. Guilloche 112 includes a hyperbolic conic section, a spiral, and a lemniscate. Guilloche 114 includes a rose, an elliptic conic section and a spiral curve. Guilloche 116 includes a cardioid and two elliptic conic sections. Guilloche 118 includes a rose, a hyperbolic conic section and an elliptic conic section. Guilloche 120 includes a rose, a hyperbolic conic section, and a spiral.

Figure 21:
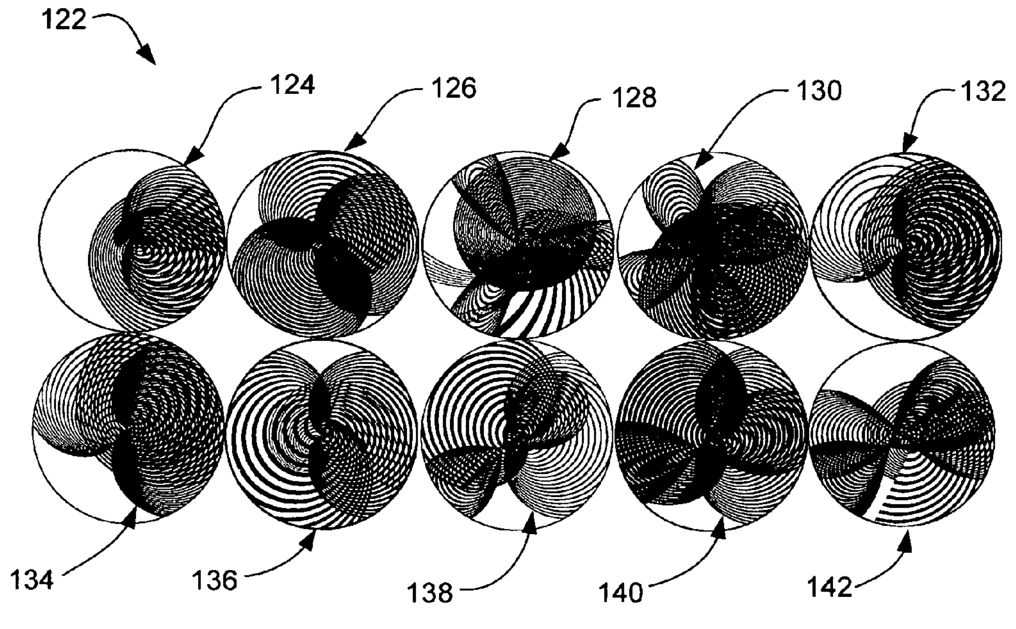
FIG. 21 provides ten examples of guilloche patterns corresponding to ten specific 8-byte alphanumeric sequences.

Guilloche patterns produced in accordance with the present disclosure can also be represented as 8-byte alphanumeric sequences. Provided in FIG. 21 is a group 122 of ten exemplary guilloche units that have been printed after qualification. Each of these guilloche units is represented by a unique 8-byte alphanumeric sequence. The guilloche patterns indicated by reference numerals 124 to 142 represent the following 8-byte alphanumeric sequences, respectively:

| | |
|---|---|
| Guilloche 124: | SSSSSSSS |
| Guilloche 126: | ABCDEFGH |
| Guilloche 128: | 12345678 |
| Guilloche 130: | Guilloch |
| Guilloche 132: | Colorado |
| Guilloche 134: | Cupertin |
| Guilloche 136: | PaloAlto |

-continued

| | |
|---|---|
| Guilloche 138: | Maastric |
| Guilloche 140: | MucherSa |
| Guilloche 142: | NgSimske |

As with the examples in FIG. 20, the guilloche patterns in FIG. 21 include multiple different curve sets, as discussed above.

Figure 22:
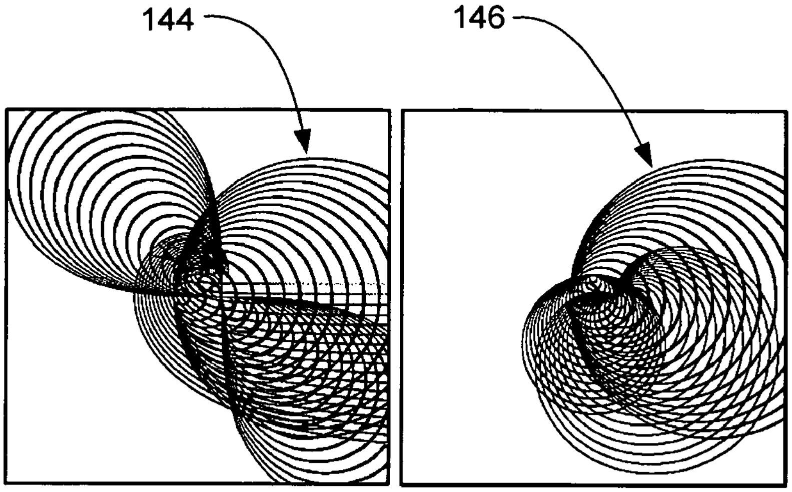
FIG. 22 provides two examples of guilloche patterns having a square border and corresponding to two of the ten specific 8-byte alphanumeric sequences illustrated in FIG. 21.

The exemplary guilloche patterns shown in FIGS. 1-21 include round borders. However, guilloche patterns produced in accordance with the present disclosure are not limited to curved borders. Shown in FIG. 22 are two examples of guilloche patterns 144, 146 having a square border. While these guilloche examples are shown having a square border, it will be apparent that other border shapes can be employed, such as other polygon shapes, including irregular polygons, and other curved shapes, both regular and irregular, and borders that are combinations of curves (including irregular curves) and straight line segments. Additionally, the guilloche patterns in FIG. 22 are in the colors of magenta, yellow and green, giving just one of many examples of different color combinations that can be used for the variable guilloche disclosed herein.

The variable guilloche disclosed herein can be extended for use as a background guilloche, and the use of a square or rectangular shape lends itself particularly well to this application. For example, the guilloche patterns can be printed in the background of a document region, and provide a backdrop against which other content is printed. The precise pattern of intersections of the guilloche lines with text can then provide an additional security feature and an additional mode of authentication. Additionally, the border of the guilloche patterns (of any shape) does not need to be a printed line. This approach can enhance the use of these patterns as background patterns. The use of background guilloche patterns can be particularly desirable for passports, tickets, certificates and other high-value single-use or identification-concerned printed materials.

Figure 26:
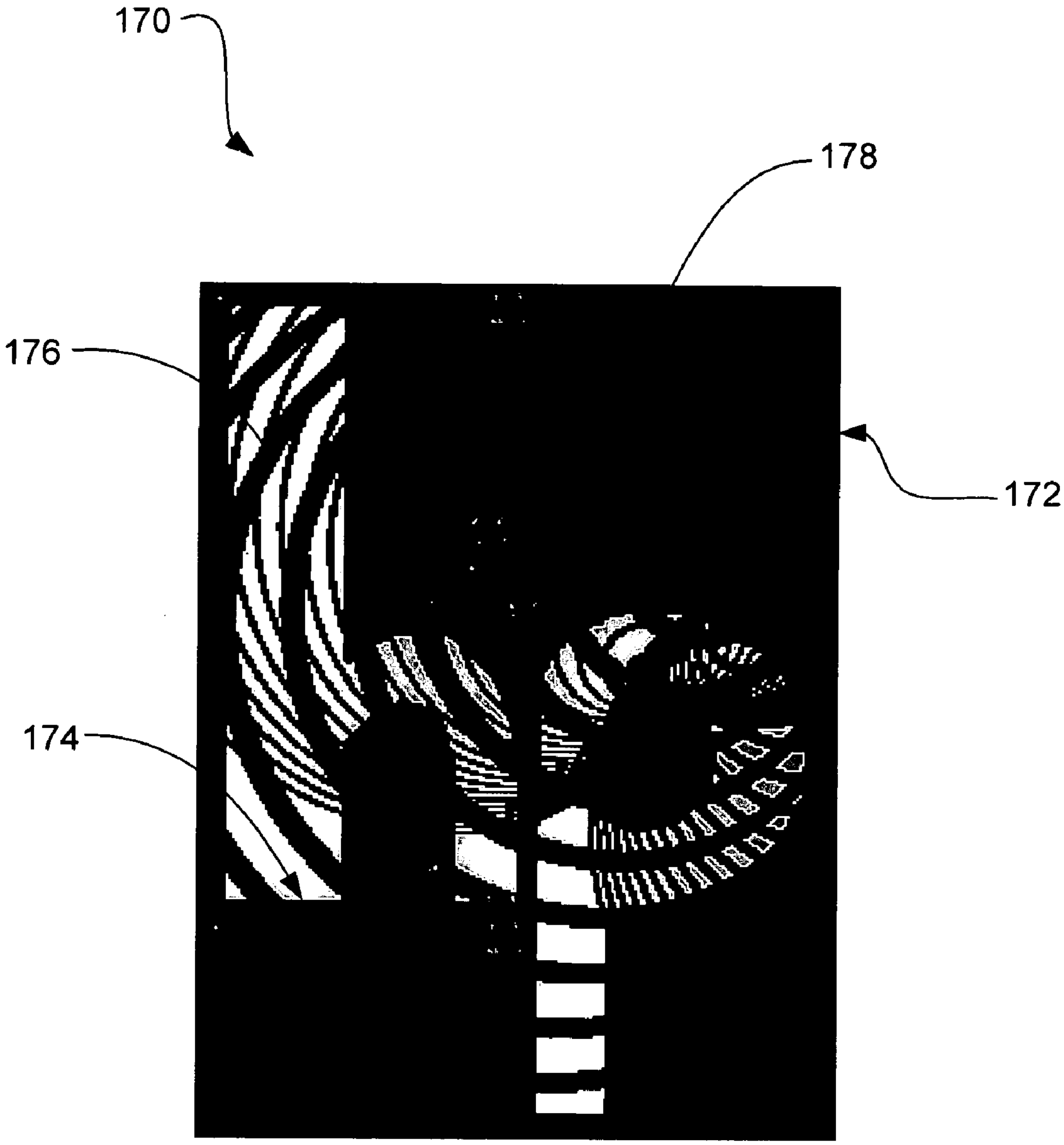
FIG. 26 provides an example of a variable guilloche pattern disposed within a border representing a brand mark.

Another way in which variable guilloche patterns in accordance with this disclosure can be used with borders of different shapes or as background guilloche patterns is shown in FIG. 26. Shown in FIG. 26 is a variable guilloche pattern, indicated generally at 170, having a rectangular outer border 172, and an internal guilloche border 174 having the shape of a brand mark. In this context, the term “brand mark” is intended to represent any word, term, name, symbol, device, logo or the like that is used to designate goods or services. In this case, the guilloche border 174 has the shape of the “hp” mark of Hewlett-Packard Company. Inside the outline of the letters “hp” is a variable guilloche pattern 176 that has been created in accordance with the present disclosure. Specifically, the guilloche pattern printed within the logo border is the same guilloche pattern 20 shown in FIG. 2, though of course only a portion of the entire guilloche pattern is visible in this example due to the shape of the internal logo border.

In the embodiment of FIG. 26, the guilloche is provided within the inner logo border 174, while the remainder of the space within the outer border 172 is completely filled in, as indicated by numeral 178. It will be apparent, however, that a brand mark guilloche border can be produced in many other ways. For example, a variable guilloche pattern can be provided as essentially the reverse of that shown in FIG. 26. That is, the guilloche can fill the background (178 in FIG. 26) within an outer border (whether the border is seen or invisible), over which or within which a brand mark or the outline of a brand mark is blocked out (e.g. the mark appears white or black and blocks out the guilloche pattern that appears to be behind it). Many other embodiments and configurations are also possible.

Figure 23:
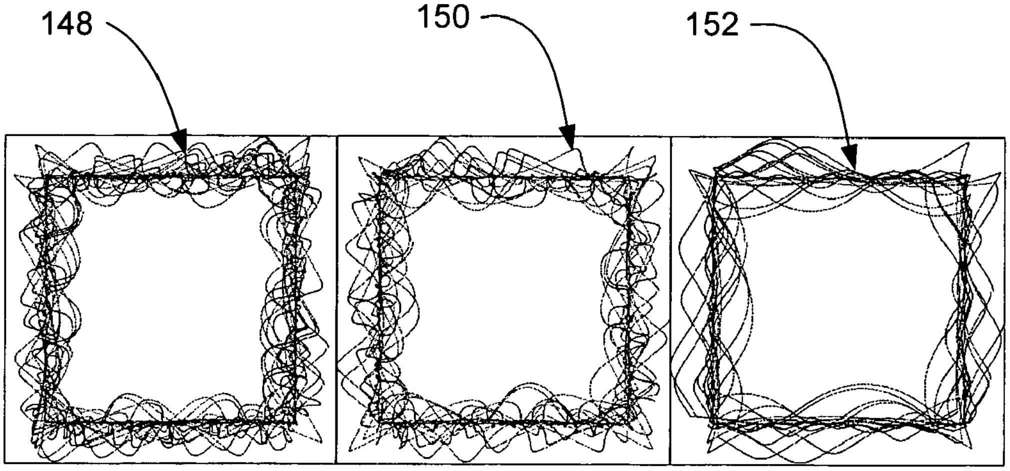
FIG. 23 provides three examples of border guilloche patterns creating a square frame with a cardioid weave.

Guilloche patterns produced in accordance with the present disclosure can also be used to create border guilloches. Shown in FIG. 23 are three exemplary border guilloche patterns 148, 150, 152 that create a square frame with a cardioid weave. While the border guilloche examples shown in FIG. 23 are all one color (magenta), it will be apparent that multiple colors can be used for border guilloches. The border curves in FIG. 23 are all cardioids, for which the effective origin is moved incrementally (at three different rates) along a border path as the cardioid is written. For these curves the origin was moved around a square (the border path) that was 75% of the height and width of the boundary square and centered within the boundary square. In guilloche 148, the effective origin was moved slowly compared to the cardioid looping. In pattern 150 the origin and cardioid looping were moved at the same rate, and in curve 152, the effective origin moved faster than the cardioid looping. This approach produces a substantially linear border of woven lines. It will be apparent that other approaches and variations can be used for creating border guilloche patterns in this way.

Figure 27:
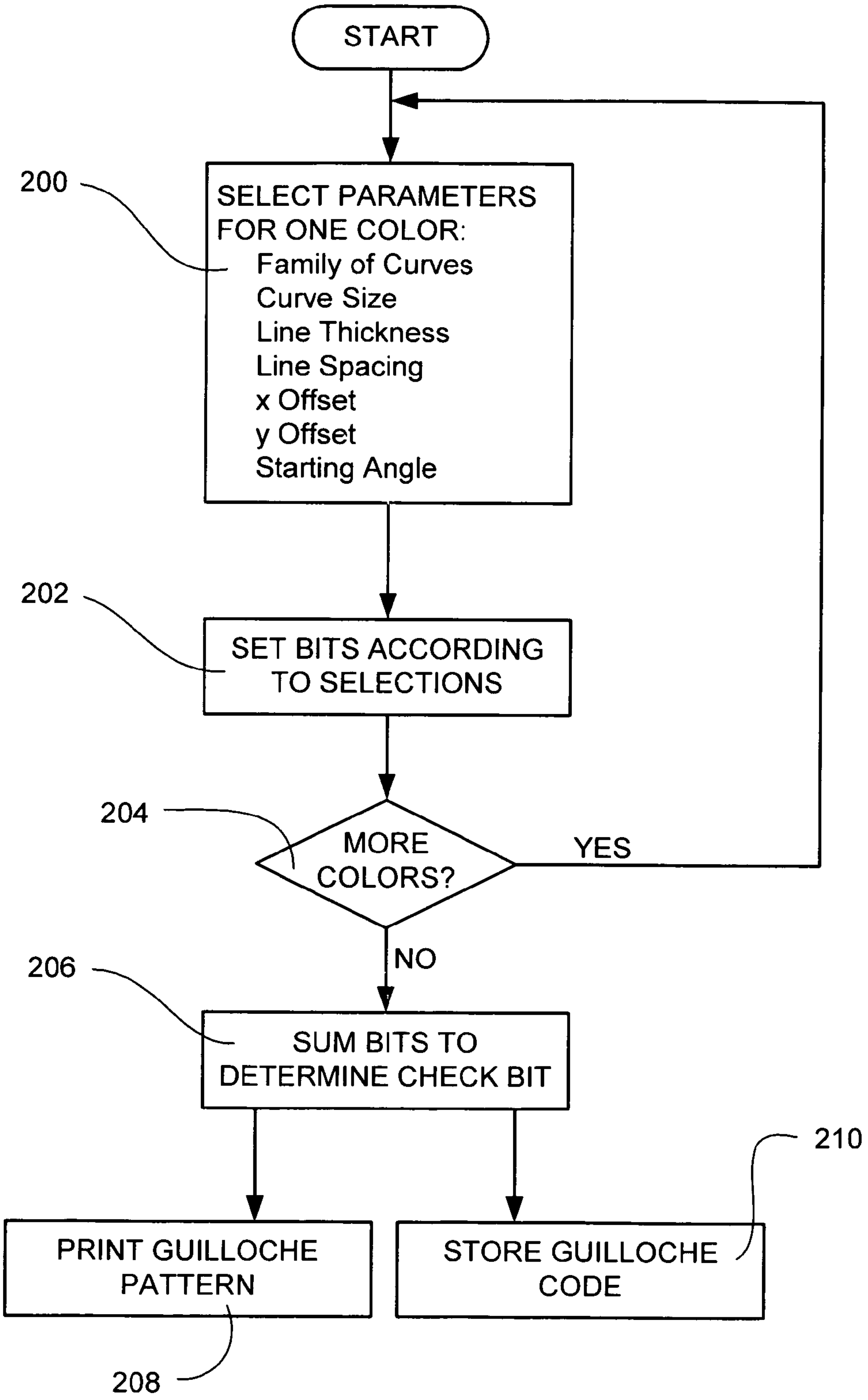
FIG. 27 is a flow chart outlining the steps in one embodiment of a method for producing a variable guilloche in accordance with the present disclosure.

One approach to creating guilloche patterns having a 64 bit code is outlined in the flow diagram of FIG. 27. In this procedure the user first selects the parameters (i.e. feature dependent variables) for one feature or color (step 200). This involves selecting the family of curves to be used, the curve size, etc. The specific bits in the 64 bit sequence are then set accordingly (step 202). That is, for example, bits 0-2 determine the type of curve; bits 9-12 set the size; bits 21-22 set the line thickness; bits 27-28 govern the line spacing; the x and y offset are set by bits 33-36 and 41-45, respectively; and the starting angle of the first feature is 0.

Once the parameters of one feature or color are set, the process involves querying whether there are additional colors to consider (step 204). If yes, the process of selecting the feature dependent variables repeats for each color. When the values for all colors have been selected, the bits comprising the string are summed to provide the checkbit (step 206). At that point the guilloche pattern can be printed (step 208) and the unique 64 bit code can be stored in memory (step 210).

Figure 28:
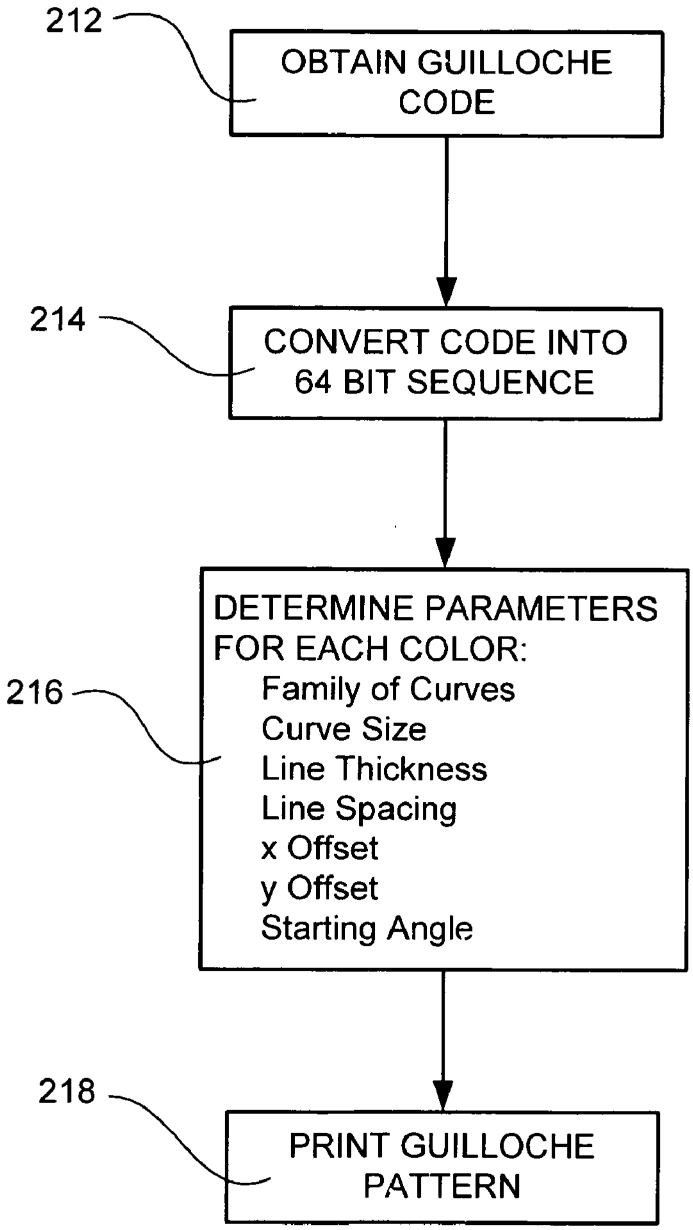
FIG. 28 is a flow chart outlining the steps in another embodiment of a method for producing a variable guilloche in accordance with the present disclosure.

An alternative approach to preparing a 64 bit guilloche pattern in the manner described above is outlined in the flow chart of FIG. 28. In this approach, the user begins with a guilloche code (step 212), such as an 8 byte alphanumeric sequence, and then converts that sequence into the corresponding 64 bit sequence (step 214). Based upon that sequence, the user then “reads” the values for the curve parameters for each feature in the guilloche (step 216). From that point the guilloche pattern can be easily printed (step 218).

The variable guilloche system and method described herein can provide a “staggered” approach to authentication, allowing various levels of expertise—from consumer to investigator—to be applicable for authentication. For a customer (i.e. a person that is not an expert) the security guilloche feature can be authenticated by its overt appearance alone. The complexity of the pattern, or the eye-catching nature of it (through the use of highly reflective ink, for example), can be the basis for a customer or other non-expert to recognize the proffered guilloche as matching the authentic guilloche. Indeed, this sort of approach, when used by customers, ordinarily will not involve obtaining an authentic guilloche and comparing it except by memory, having seen authentic patterns previously. With this approach, guilloche patterns can be manipulated to catch the customer’s attention, and the patterns can be used as a platform for specialty inks, for overprinting tamper-evident areas (e.g. tear strips, scratch-off zones), etc.

Figure 24:
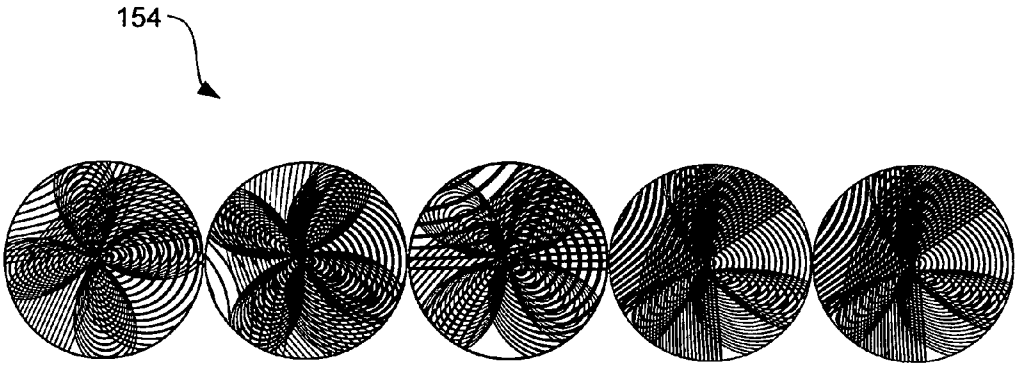
FIG. 24 provides an embodiment of a guilloche security feature comprising five unique guilloche patterns in sequence.
Figure 25:
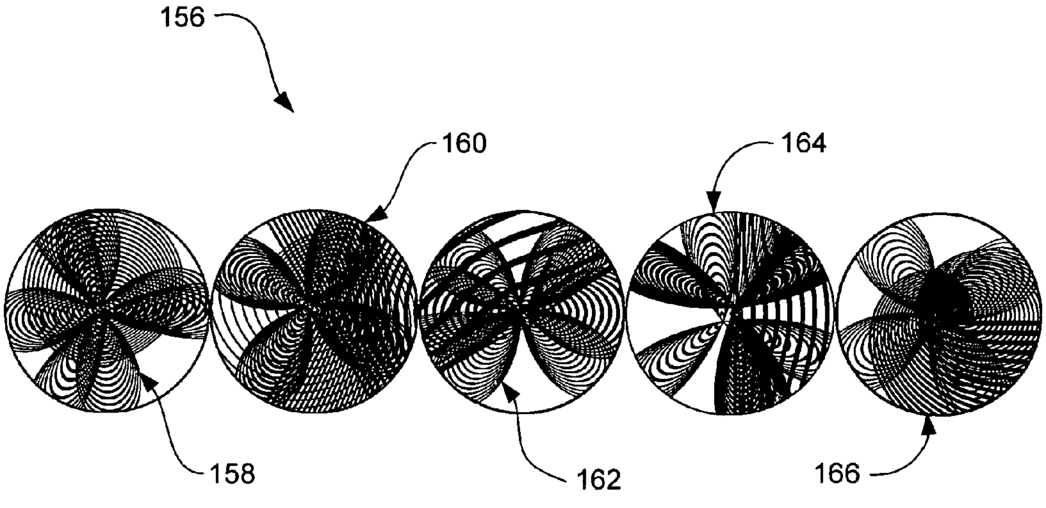
FIG. 25 provides another embodiment of a guilloche security feature comprising five unique guilloche patterns in sequence.

For a retailer, aspects of the deterrent can be held "constant" for a case or pallet to provide greater convenience in identification and moving of goods. For example, the color and shape features can be kept constant, allowing a given guilloche pattern to be readily visually recognized without much training. For example, a guilloche pattern having a yellow hyperbolic conic section, magenta roses and cyan ellipses can be associated with a given product, making identification by a retailer or the retailer's employees simpler. Additionally, a group of several unique guilloche patterns can be used together as a product identifier. Depicted in FIG. 24 is an embodiment of a guilloche security feature comprising a group 154 of five unique guilloche patterns in sequence. A unique sequence of this sort can be readily identifiable by a retailer in the ordinary course of commerce. Provided in FIG. 25 is another embodiment of a guilloche security feature comprising a group 156 of five unique guilloche patterns in sequence.

For an inspector or other person trained in differentiating between authentic guilloche patterns and copies or forgeries, there can be a more sophisticated approach, such as by holding several aspects static in a print run. For example, considering the guilloche sequence of FIG. 25, the angle (relative to the x and y offset) and the type of family of curves of the second feature of each guilloche in the series can be held constant. In FIG. 25, the second feature of each guilloche is a rose shaped pattern designated by numerals 158-166, even though 4 of these are 4-leafed and 1 is 3-leafed, and all are offset the same angle (with respect to the angle of offset in (x,y)). This type of approach can make authentication simpler for skilled persons.

Figure 29:
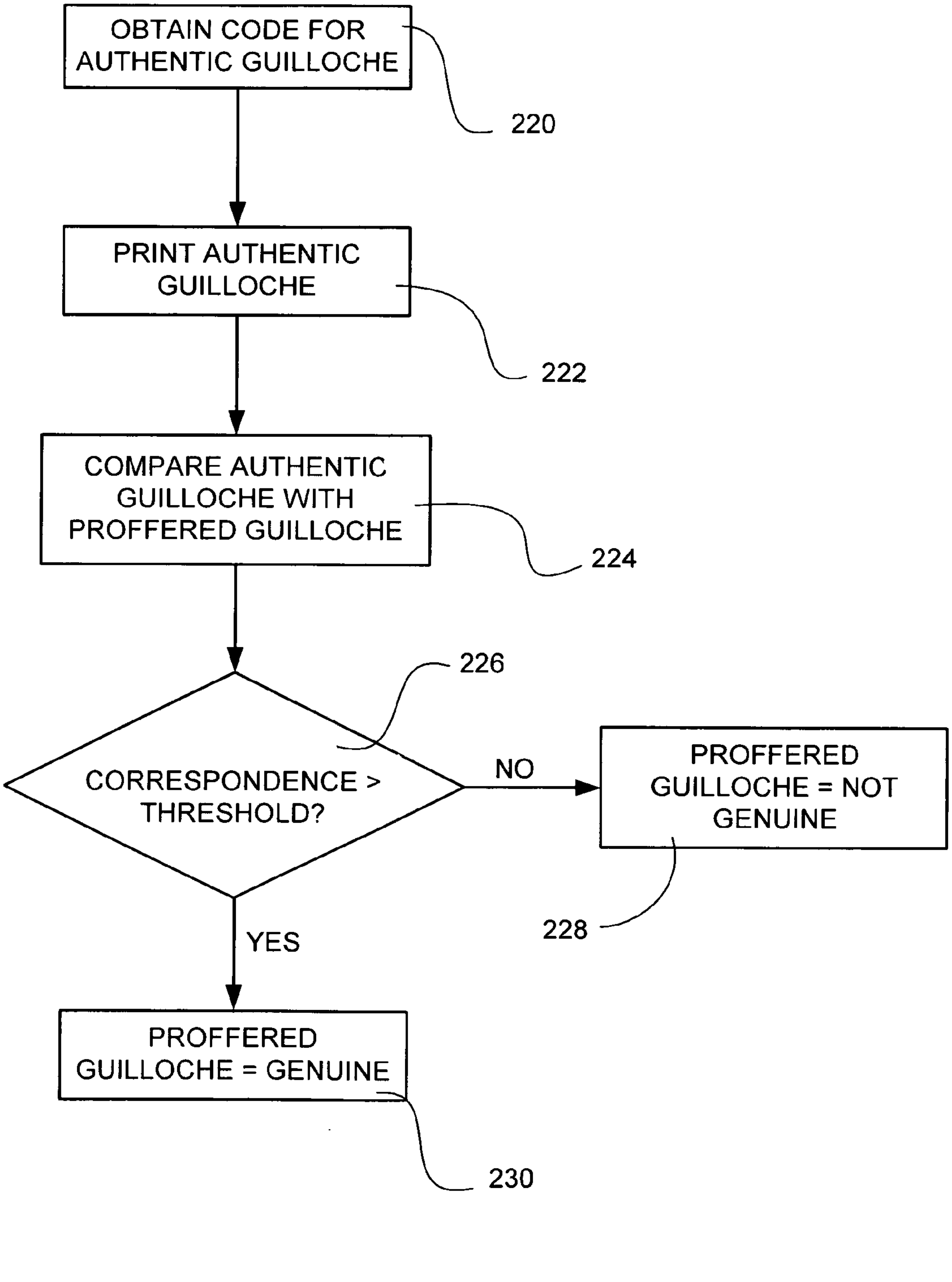
FIG. 29 is a flow chart outlining the steps in one embodiment of a method for authenticating a variable guilloche pattern in accordance with the present disclosure.

One approach to high level authentication of guilloche patterns produced in accordance with the present disclosure is outlined in FIG. 29. In this process, the user first obtains the code for an authentic guilloche pattern (step 220). This can be as an 8 byte alphanumeric sequence, which is then converted into the corresponding 64 bit sequence, or the 64 bit sequence itself. The user then prints the authentic guilloche from this sequence (step 222).

The next step is to compare the authentic guilloche pattern with a proffered guilloche pattern (i.e. the one that is being authenticated) (step 224). This step can involve a variety of different actions. Forensic analysis of security guilloche patterns can be done manually or automatically. Manually, the forensic analyst can authenticate the deterrent with a magnifying lens or zoomed copy, a ruler and a compass (along with a "cheat sheet", or look-up table). One method of authentication involves searching for a unique pattern of overlap points in a given guilloche. Since the guilloche patterns are designed such that the base inks overlap in at least a portion of the deterrent, this method looks for the locations of overlap or component colors. For example, where the base colors are C, Y and M, colors where two lines overlap will be R, G or B, and locations of triple overlap will be black.

In one embodiment, the guilloche can be scanned to look for the locations of black pixels only. The analyst then performs either a Hough transform to get a "directionality histogram" of the black pixels, or else performs correlation of the black pixels against an intelligently-reconstructed set of plausible matches. This is the highest level of analysis, because it performs best when the C, M and Y inks are perfectly registered, and when the C+M+Y ink provide an excellent black, and therefore reduces the chance that copies or knock-offs made using low-quality printers will authenticate.

Authentication can also be performed from individual colors. This is an excellent approach when an overt effect is added (e.g. when quantum dots are added to one of the colors). Here, a single color is segmented from the image and analyzed either by Hough transform or correlation against plausible matches. Overt effects can help in the segmentation by making a particular hue stand out.

Another authentication approach is classification and comparison. This approach can be used for lower quality printing, wherein the black pixels or single color methods fail due to registration, color constancy, or other image quality concerns. It may also be used for many lower- to middle-quality capture devices (cameras, scanners, even some vision systems). In this approach, a decision graph for the classification of the image is traversed (e.g. high or low black content, high or low overlap of C and M, etc.) until a smaller set of possible matches remains. Then, for example, the C, M, Y and K (black) Hough histograms of the original image and candidate matches can be compared.

Referring back to FIG. 29, whatever approach is used to analyze the proffered guilloche, the ultimate question that is asked is whether the proffered pattern corresponds to the authentic guilloche pattern above some established threshold (step 226). If an authentic guilloche pattern is copied using a digital color scanner, for example, and then printed, the pixel locations in the scanned copy will always have some deviation from the authentic pattern simply due to the fact that the scanned pixels are not aligned precisely with the pixels of the original. Consequently, a copy that is of high resolution and appears to the eye as being essentially identical to an authentic pattern can be detected through methods that measure the correspondence of pixel locations for each color (or for component color points or black points, etc., as discussed above). Using this method, the creators of the authentic guilloche patterns can set a threshold of pixel correspondence. If the correspondence level is below the threshold, the proffered guilloche is determined to be a fake (step 228). If the correspondence is above the threshold, the guilloche is considered to be genuine (step 230).

Figure 30:
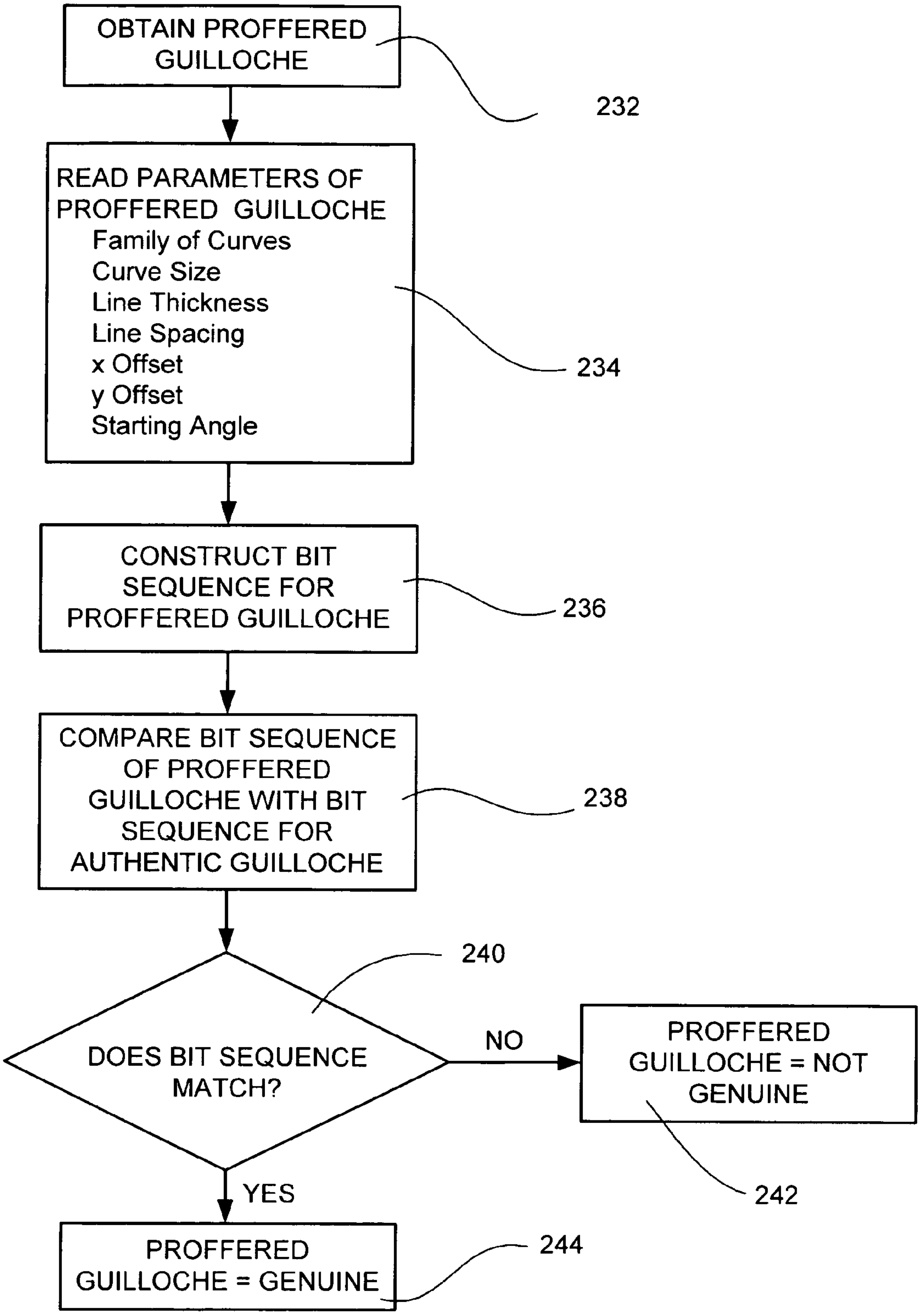
FIG. 30 is a flow chart outlining the steps in another embodiment of a method for authenticating a variable guilloche pattern in accordance with the present disclosure.

Another approach to authenticating a guilloche prepared in accordance with the present disclosure is outlined in FIG. 30. In this method, the user first obtains a guilloche to be authenticated (step 232). This pattern is then analyzed (e.g. by machine scanning methods) to decode the 64 bits of information stored in them. This information comprises the parameters of the guilloche curves, such as family of curves, curve size, etc. for each color (step 234). Based upon this information, the method then allows one to construct the 64 bit sequence that corresponds to the proffered guilloche (step 236). This sequence can then be compared to the bit sequence(s) for an authentic guilloche(s) (step 238). At this point, the question is whether the bit sequence corresponding to the proffered guilloche matches an authentic guilloche bit sequence (step 240). If not, the guilloche is considered a fake (step 242). If it does match, the guilloche is determined to be genuine (step 244).

The authentication approaches discussed above are only some of the approaches that can be used with guilloche patterns prepared according to the present disclosure. There are many additional approaches to authentication beyond those method steps shown and discussed herein.

The 64-bit guilloche discussed herein is only one of many different possible embodiments. For qualification of the guilloche patterns shown herein the inventors have selected elements and aspects of the features to make authentication easier and to provide a robust deterrent. For example, the inventors selected the different values for thickness and spacing, angles, etc., to prevent any two bit streams from having identical form. Additionally, all three sets of curves can be forced to overlap in at least some portion of the guilloche pattern, thus ensuring that there will be black pixels, and allowing a black pixel distribution-based authentication approach. Furthermore, the inventors have allowed enough room in the element steps (for change in thickness, spacing, angle, color, etc.) to make authentication robust. Additionally, in the guilloche system described herein it is a relatively straightforward matter to change the element sets for thickness, spacing, angle, etc., depending on feedback about print quality and feature authentication reliability. In other words, the exact specifications for deployment can be adjusted for a given print technology.

The variable guilloche system and method described herein provides a difficult-to-reproduce overt (visible) security printing deterrent based on guilloche-like families of curves. It can provide 64 bits (or more) of variability, including steganographic information (if desired) in the feature. The default feature size can be quite small (e.g. less than 0.5×0.5 inches at 812.8 dpi) and can be combined with curved (e.g. circular), square or other shaped background borders. Rotation is implicitly incorporated into the feature, and branding can be provided through color, angle, size, shape and border choices. The variable guilloche system can also provide a background or border deterrent.

Advantageously, multiple guilloche patterns can be printed (e.g. consecutively) in one general location (e.g. on one product label), increasing the potential data density, and data can be linked to other features (e.g. 64 bits can accommodate many RFID (Radio Frequency Identification) formats, or variable portions thereof. The security guilloches can also be readily coupled with specialty inks (e.g. luminescent, metallic, thermo-chromic, quantum dot, conductive inks, etc.) to provide a more difficult-to-copy deterrent.

Additionally, new guilloche patterns can be readily added. While the inventors have used 8 different curve families, many other curve families can also readily added. They can be branded by color, initial angle, "B" value for the conic sections, size of pattern, shape of boundary, etc. The guilloche system described herein is also robust with respect to rotation. For example, simple rotational guilloche alphanumeric systems have been developed that use a small number of guilloche patterns that are rotated in certain ways to correspond to alphanumeric characters. However, these systems are generally sensitive to skew during image capture, and thus frequently use orienting, registration or fiducial marks to allow a machine to read and properly interpret them. Advantageously, the present system has a set angle for the first feature, and so is insensitive to skew. This system is also readily translatable to circular and polygonal features-as-features, background guilloches, and borders. Moreover, authentication can be staggered, allowing for various levels of sophistication and complexity.

Striking overt features like guilloche patterns are valuable for use with a broad range of products, particularly products of intermediate expense, those not affecting a person's health or safety (so that the human "cost" of counterfeiting is low), and those that are sold through marketing channels not directly from the manufacturer. Guilloche patterns of this sort can be used on product packaging and for inspection services. For example, machine-readable variable guilloche patterns can be printed in the margins of print sheets in place of 2-D bar codes. The guilloche deterrent described herein is very applicable to these types of products and uses.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A printed article, comprising:

an article printed with a number of overt security features, a first feature including a set angle and a second feature including at least two guilloche curves, the curves being printed in a common space and having at least one point of overlap therebetween, the curves being determined from equations having variables determinative of a size and shape of the curves, the variables corresponding to a specified digital data string of steganographic information, wherein the digital data string of steganographic information is further covertly embodied in, and ascertainable from, one of several colors and one of several starting angles of each of the curves.

2. A printed article in accordance with claim 1, wherein each guilloche curve comprises a family of geometric curves plotted in polar coordinates.

3. A printed article in accordance with claim 1, wherein each guilloche curve is selected from the group consisting of cardioids, roses, limaçons, lemniscates, spirals, conchoids, elliptic conic sections, and hyperbolic conic sections.

4. A printed article in accordance with claim 1, further comprising a border, the at least two guilloche curves being bounded thereby.

5. A printed article in accordance with claim 4, wherein the border has a shape selected from the group consisting of curved, polygonal, a combination of curves and straight line segments, and a border having a shape of a brand mark.

6. A printed article in accordance with claim 1, wherein the at least two guilloche curves comprises a plurality of overlapping curve families, each curve family being printed of a different base color print ink.

7. A printed article in accordance with claim 6, wherein locations of overlap of curves of differing base colors produces regions of component colors representing a combination of at least two base colors.

8. A printed article in accordance with claim 6, wherein the base color print inks are selected from the group consisting of cyan, magenta and yellow.

9. A printed article in accordance with claim 1, wherein the steganographic information corresponds to a 64 bit sequence of data.

10. A printed article in accordance with claim 9, wherein the 64 bit sequence includes bits representing variables selected from the group consisting of: the type of curve; the curve size; line thickness; line spacing; x offset; and y offset.

11. A printed article in accordance with claim 1, wherein the at least two guilloche curves provide a guilloche pattern that comprises a plurality of guilloche units printed in close proximity.

12. A printed article in accordance with claim 1, wherein the at least two guilloche curves are plotted with an effective origin that moves incrementally along a border path to produce an elongate border of woven lines.

13. A printed article, comprising:

an article printed with a number of overt security features, a first feature including a set angle and a second feature including a guilloche pattern of a plurality of geometric curves, the plurality of geometric curves including:

a first family of geometric curves, printed in a printing space of a first base color, plotted from a first family of equations having variables determinative of a size and shape of the first family of geometric curves, the variables corresponding to a first portion of a digital data string of steganographic information; and a second family of geometric curves, printed in the printing space of a second base color, plotted from a second family of equations having variables determinative of a size and shape of the second family of geometric curves, the variables corresponding to a second portion of the digital data string of steganographic information, wherein the digital data string of steganographic information is further covertly embodied in, and ascertainable from, one of several colors and one of several starting angles of each of the geometric curves.

14. A printed article in accordance with claim 13, further comprising a border, bounding the first and second families of geometric curves.

15. A printed article in accordance with claim 13, wherein the families of guilloche curves are selected from the group consisting of cardioids, roses, limaçons, lemniscates, spirals, conchoids, elliptic conic sections, and hyperbolic conic sections.

16. A printed article in accordance with claim 13, further comprising multiple overlap points of curves of the first and second base colors, the overlap points producing regions of component colors representing a combination of the two base colors.

17. A method for printing steganographic information, comprising:

obtaining a code representing a digital sequence of variables comprising steganographic information; and printing a guilloche pattern on an article, printed with a number of overt security features, a first feature including a set angle and a second feature including at least two geometric curves, the at least two geometric curves within a common space from equations having variables determinative of a size and shape of the geometric curves, the variables corresponding to the digital sequence of variables, wherein the digital sequence of variables of steganographic information is further covertly embodied in, and ascertainable from, one of several colors and one of several starting angles of each of the geometric curves.

18. A method in accordance with claim 17, wherein obtaining a code representing a sequence of variables comprising steganographic information comprises selecting parameters for the at least two curves.

19. A method in accordance with claim 17, wherein obtaining a code representing a sequence of variables comprising steganographic information comprises obtaining a digital code representing the sequence of variables.

20. A method in accordance with claim 17, wherein printing the at least two curves comprises printing each of the at least two curves in a different color.

* * * * *